(12) United States Patent
Davis

(10) Patent No.: US 6,575,483 B1
(45) Date of Patent: Jun. 10, 2003

(54) CARRIAGE FOR SUSPENDED TRANSPORTATION OF HARVESTED GAME ANIMALS

(76) Inventor: Lucian Wayne Davis, Route 1, Box 48B, Bartlett, TX (US) 76511

( * ) Notice: Subject to any disclaimer, the term of this patent is extended or adjusted under 35 U.S.C. 154(b) by 13 days.

(21) Appl. No.: 09/611,677

(22) Filed: Jul. 7, 2000

Related U.S. Application Data

(60) Provisional application No. 60/142,802, filed on Jul. 8, 1999.

(51) Int. Cl.[7] .............................................. B62D 61/00
(52) U.S. Cl. ...................................... 280/63; 280/47.35
(58) Field of Search ............................ 280/47.3, 47.32, 280/659, 47.17, 639, 78, 652, 47.24, 63, 47.35

(56) References Cited

U.S. PATENT DOCUMENTS

| | | | | |
|---|---|---|---|---|
| 2,416,492 A | * | 2/1947 | Neeley | 280/47.3 |
| 2,624,588 A | * | 1/1953 | Jones | 280/47.3 |
| 2,629,608 A | * | 2/1953 | Jones | 280/47.3 |
| 2,715,030 A | * | 8/1955 | Peterson | 280/47.3 |
| 2,918,296 A | * | 12/1959 | Goodale | 280/47.3 |
| 2,979,338 A | * | 4/1961 | Dwyer | 280/47.3 |
| 3,034,801 A | * | 5/1962 | Huston | 280/47.3 |
| 3,236,537 A | * | 2/1966 | Eckman | 280/47.3 |
| 3,328,046 A | * | 6/1967 | Drew | 280/47.3 |
| 3,456,959 A | * | 7/1969 | Hemphill et al. | 280/47.3 |
| 3,662,803 A | * | 5/1972 | Kuvik | 280/47.35 |
| 3,907,323 A | * | 9/1975 | Knapp et al. | 280/47.3 |
| 4,045,040 A | | 8/1977 | Fails | |
| 4,055,354 A | * | 10/1977 | Sharpe | 280/47.32 |
| 4,214,774 A | * | 7/1980 | Kluge | 280/652 |
| 4,431,121 A | | 2/1984 | Bensette | |
| 4,809,998 A | * | 3/1989 | Girvin | 280/250.1 |
| 4,838,565 A | * | 6/1989 | Douglas et al. | 280/1.5 |
| 5,149,116 A | * | 9/1992 | Donze et al. | 280/63 |
| 5,295,556 A | | 3/1994 | Mullin | |
| 5,330,212 A | * | 7/1994 | Gardner | 280/652 |
| 5,492,196 A | | 2/1996 | Michno | |
| 5,586,778 A | * | 12/1996 | Lindh et al. | 280/40 |
| 5,642,846 A | | 7/1997 | Morrow | |
| 5,903,997 A | * | 5/1999 | Jacob | 280/47.3 |

* cited by examiner

*Primary Examiner*—Robert P. Olszewski
*Assistant Examiner*—Elaine Gort

(57) ABSTRACT

A carriage for suspended transportation of harvested games animals, the carriage consisting of a buck pole having a forward end and a rearward end, splayed left and right pole support legs, each pole support leg having an upper end and a lower end, the upper end of each pole support leg being universally pivotally attached to the buck pole for lateral extension and retraction, and for vertical extension and retraction; left and right wheels removably attached to the lower ends of the pole support legs, and a pull handle or pull harness removably attached to the forward end of the buck pole.

16 Claims, 8 Drawing Sheets

CARRIAGE FOR SUSPENDED TRANSPORTATION OF HARVESTED GAME ANIMALS

RELATED PATENT APPLICATIONS

This patent application claims priority to United States Provisional Application No. 60/142,802 filed Jul. 8, 1999 entitled GAME HAULING DEVICE. The aforementioned application in its entirety is hereby expressly incorporated by reference into the present application.

DESCRIPTION

1. Field of the Invention

The instant invention relates to buck poles and game carrying carts.

2. Background of the Invention

Buck poles and wheeled carts represent two common means of transporting large harvested game animals such as deer out of the wilderness. A buck pole assembled for use typically comprises, for example, a deer, a pair of thongs, and a wooden pole approximately ten feet long. The deer's front and rear ankles are tied together with the thongs. The pole is then extended longitudinally between the deer's legs. A pair of hunters then shoulder the ends of the pole, lifting the deer off of the ground, and suspending the deer beneath the pole. With the deer so suspended from the buck pole, the deer may be carried for long distances. The buck pole assembly desirably provides a low center of gravity for stability and high ground clearance for traversing obstacles such as brush. The buck pole assembly undesirably requires two hunters to operate.

A common game carrying cart typically comprises a load bearing bed, a pull handle extending forwardly from the load bearing bed, and a pair of wheels rotatably mounted upon and extending downwardly from the load bearing bed. Such game carrying carts desirably allow single hunter operation. Such game carrying carts undesirably sacrifice the stability of a low center of gravity in order to achieve acceptable ground clearance.

The instant invention eliminates the above noted undesirable traits of common buck poles and game carts, while achieving and preserving their above noted desirable traits, by combining in a single carriage apparatus structural features of both buck poles and common game carts.

BRIEF SUMMARY OF THE INVENTION

A primary structural component of the present invention comprises an approximately six feet long jointed buck pole. Attaching means are provided for extending a pair of pole support legs downwardly and rearwardly from the buck pole, such legs being rigidly supported in such positions by a pair of triangulating braces extending from the buck pole to the lower ends of the pole support legs. While the upper ends of pole support legs may suitably be permanently attached to the buck pole by means such as welding, pivotal mounting means are preferably provided.

To facilitate pivotal mounting of the pole support legs, a space joint is preferably provided, the space joint facilitating alternate pivotal splaying and retracting motion of the pole support legs; the space joint further facilitating alternate downward and upper pivoting motion of the pole support legs in unison with respect to the buck pole. Upon operation of the space joint to downwardly extend and outwardly splay the pole support leg, such legs and buck pole are configured for suspended carriage of a large game animal in a manner common to conventional buck poles. Upon an alternate operation of said space joint to outwardly splay and upwardly retract the pole support legs, the buck pole and legs may be configured for service as a common game cart with an attached load bed. In order to facilitate such alternate game suspension and load bed support configurations, it is preferred that the upper ends of the triangulating braces be alternately forwardly and rearwardly positionable.

Left and right wheels, along with wheel attaching means respectively attaching the wheels to the lower ends of the left and right pole support legs are necessarily provided. Preferably, the left and right wheels are supported by left and right wheel receiving yokes or forks, and preferably the upper ends of said forks and the lower ends of the left and right pole support legs are configured to include closely fitted slip joint sleeves and slip joint necks. Suitably, other wheel attaching means may be utilized such as left and right axles fixedly attached to the lower ends of the left and right pole support legs, or left and right axle receiving channels incorporated as a part of the lower ends of the pole receiving legs. While it is preferred that the wheels be removably attachable for ease of disassembly and compactness in storage, the wheels may suitably be permanently attached to the lower ends of the pole support legs.

Necessarily, a pull harness or handle, along with harness attaching means are provided, allowing for convenient pulling of the carriage by a single hunter. Preferably, the pull harness or handle comprises a pair of shoulder engaging hooks. Suitably, the pull harness or handle may be configured as shoulder engaging straps, as an "L" handle, or as a "T" handle. Preferably, the harness attaching means comprises a shaft section which may alternately serve as a forward extension of the buck pole and as an upwardly angled extension of the buck pole; the forwardly extending orientation being utilized upon configuration of the carriage for game suspension, and the upwardly angled orientation of said section being utilized upon configuration of the carriage for support of a load bed. Preferably, upon operation of the space joint to upwardly pivot the pole support legs to their load bed supporting positions, the space joint exposes an upwardly opening shaft receiving aperture adapted for receiving and securely positioning said forward section of the buck pole in its upwardly angled position.

Preferably, forward and rearward removably attachable T-brackets are provided for respective installation upon the forward and rearward ends of the buck pole, such brackets facilitating suspended carriage of game animals such as deer. Suitably, though less desirably, a game animal may be tied to the buck pole by thongs or straps in the conventional fashion as described above. Also preferably, a removably attachable load bearing bed is provided, such bed being adapted for mounting upon upper surfaces of the buck pole and the pole support legs upon upward pivoting retraction of such legs to their load bed supporting configuration.

Accordingly, it is an object of the present invention to provide a carriage for transportation of harvested game animals, such carriage having a buck pole supported by a pair of legs, the legs having wheels rotatably mounted upon their lower ends.

It is a further object of the present invention to provide such a carriage which is reconfigurable for support of a removably attachable load bearing bed.

It is a further object of the present invention to provide a carriage having inwardly retractable structural elements and having readily disassembleable elements for compact and convenient storage.

Other and further objects, benefits, and advantages of the present invention will become known to those skilled in the art upon review of the Detailed Description which follows and upon review of the appended drawings.

DETAILED DESCRIPTION OF A PREFERRED EMBODIMENT

Figure 1:
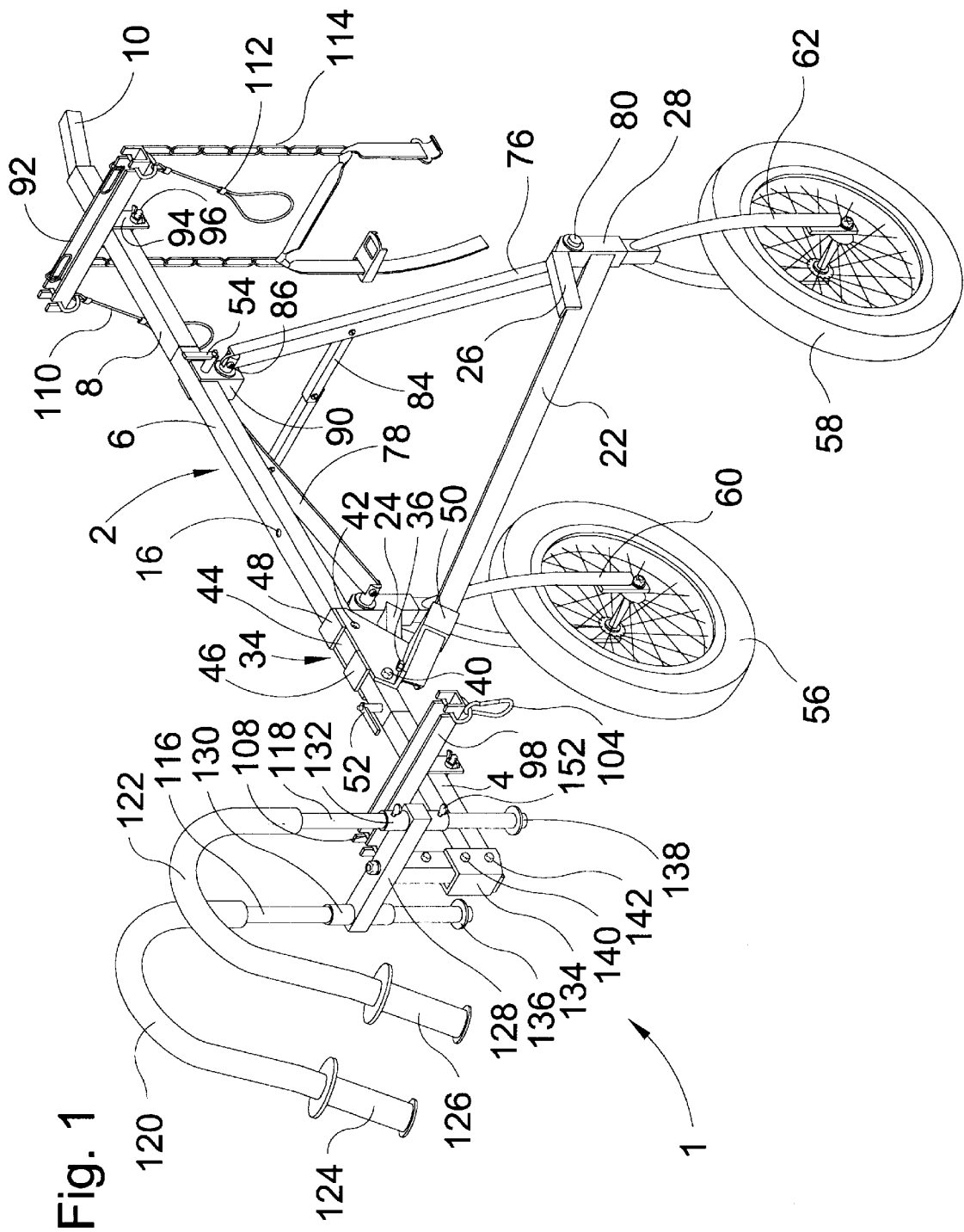
FIG. 1 is an isometric view of the present invention shown in its game suspending configuration.
Figure 3:
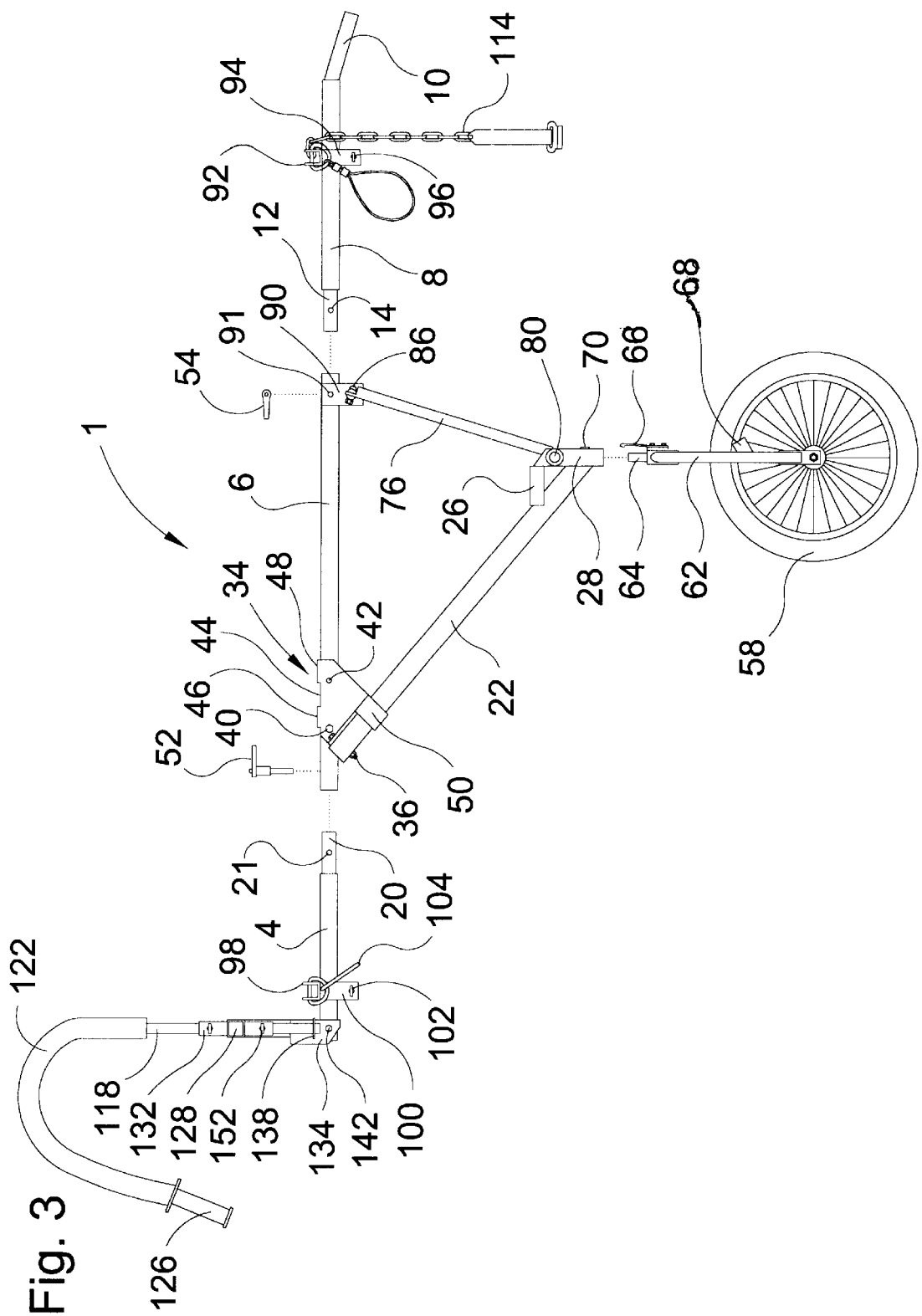
FIG. 3 redepicts FIG. 2 as partially exploded.

Referring now to the drawings, and in particular to FIG. 1, a buck pole designated by reference arrow 2 preferably comprises a forward section 4, a middle section 6, and a rearward section 8. Referring simultaneously to FIGS. 1 and 3, the rearward end of the forward section 4 preferably is inwardly coffered, forming a slip joint neck 20, such neck being slidably insertable into the forward end of forward section 6. Also, a preferably, the forward end of the rearward section 8 forms an a inwardly coffered slip joint neck 12 for slidable insertion into the rearward end of middle section 6. Also, preferably, the rearward end of rearward section 8 forms an inwardly coffered slip joint neck 10, such neck being alternately slidably insertable into the rearward end of middle section 6.

Figure 7:
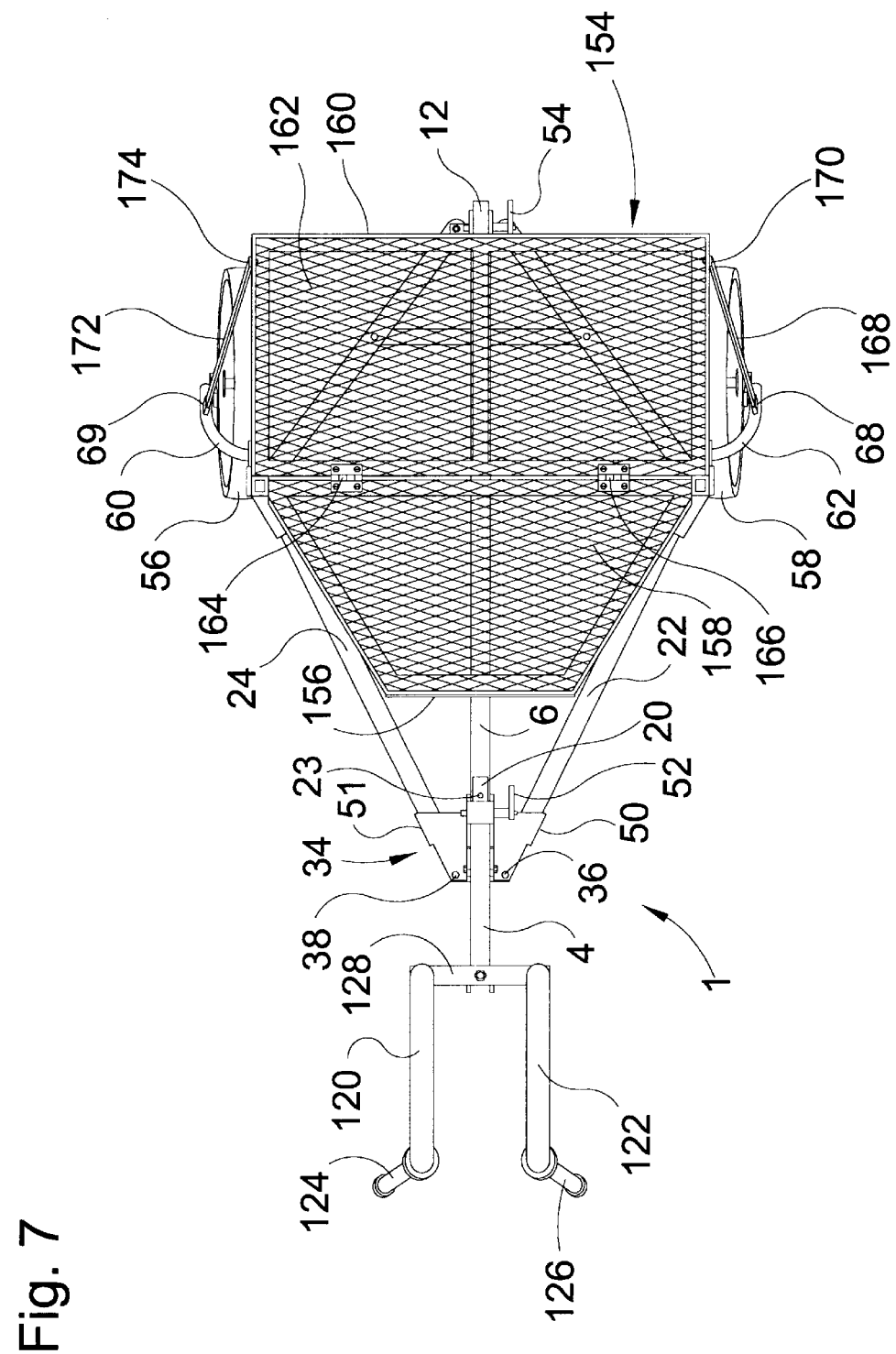
FIG. 7 is an upper plan view of the apparatus depicted in FIG. 5.
Figure 8:
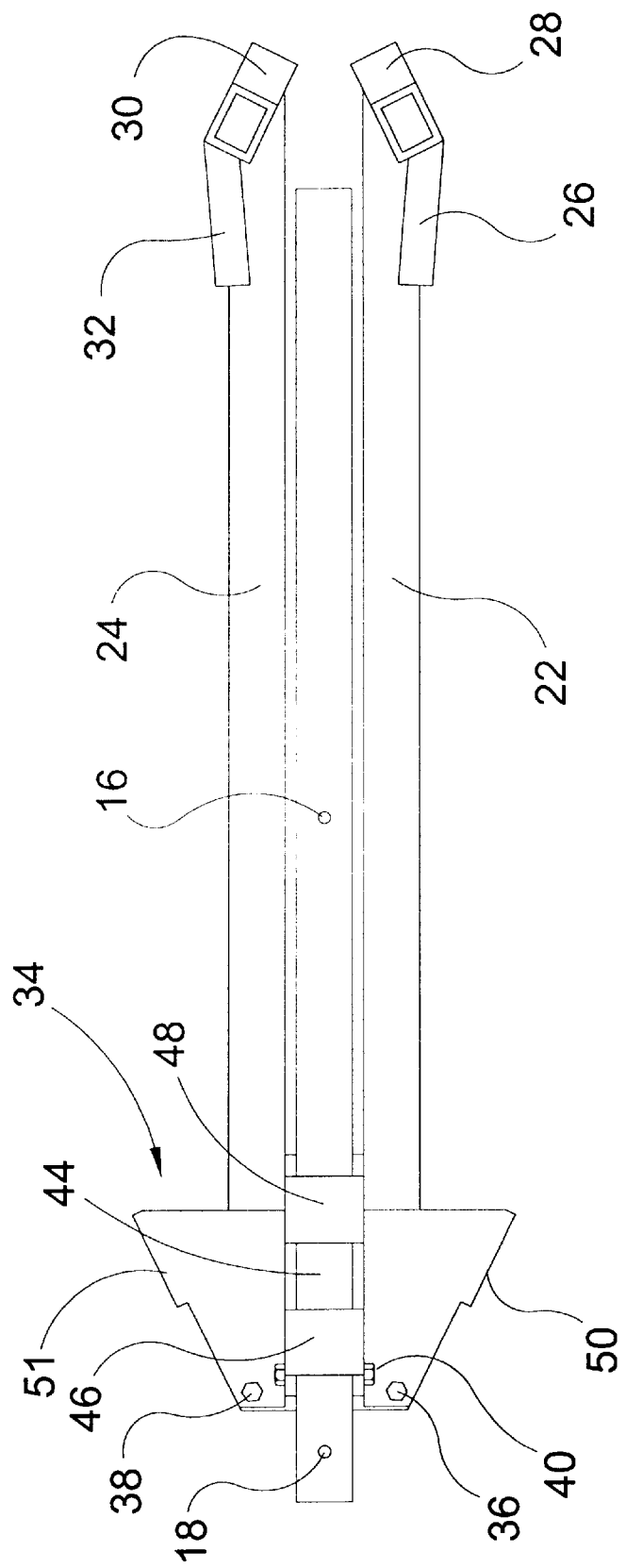
FIG. 8 is a plan view of a disassembled component of the present invention, such component comprising a middle buck pole section, and left and right pole support legs, such legs being connected to said section by a space joint.

Referring simultaneously to FIGS. 1, 7, and 8, forward section 4 is preferably removably attached to the forward end of middle section 6 by means of a quick release sheer pin 52, such pin extending through an aperture 18 within the upper wall of middle section 6, and thence through a pin receiving aperture 23 within the upper surface of coffered slip joint neck 20.

Referring simultaneously to FIGS. 1 and 3, the forward end of rearward section 8 is preferably removably attached to the rearward end of middle section 6 by means of a second sheer pin 54, said sheer pin extending laterally through a sheer pin receiving aperture 91 within channel bracket 90, thence through an underlying pin receiving aperture within the side wall of the rearward end of middle section 6, and thence through pin receiving aperture 14 within the side wall of coffered slip joint neck 12.

The slip joint and sheer pin attachments of the forward section 4 and of rearward section 8 to the middle section 6 allow such forward and rearward sections to be conveniently removed for compact storage or for carriage reconfiguration as described below.

Referring again to FIG. 1, left and right pole support legs 22 and 24 are preferably universally pivotally attached to the forward end of the middle section 6 of the buck pole 2 by means of a space joint designated by reference arrow 34. Referring simultaneously to FIGS. 1 and 8, pivot pins 36 and 38 allow pole support legs 22 and 24 to alternately pivotally move between an outwardly splayed configuration as depicted in FIG. 1 to an inwardly retracted storage position as depicted in FIG. 8. Pivot stops 50 and 51 of space joint 34 limit pivotal splaying motion of pole support legs 22 and 24.

Figure 5:
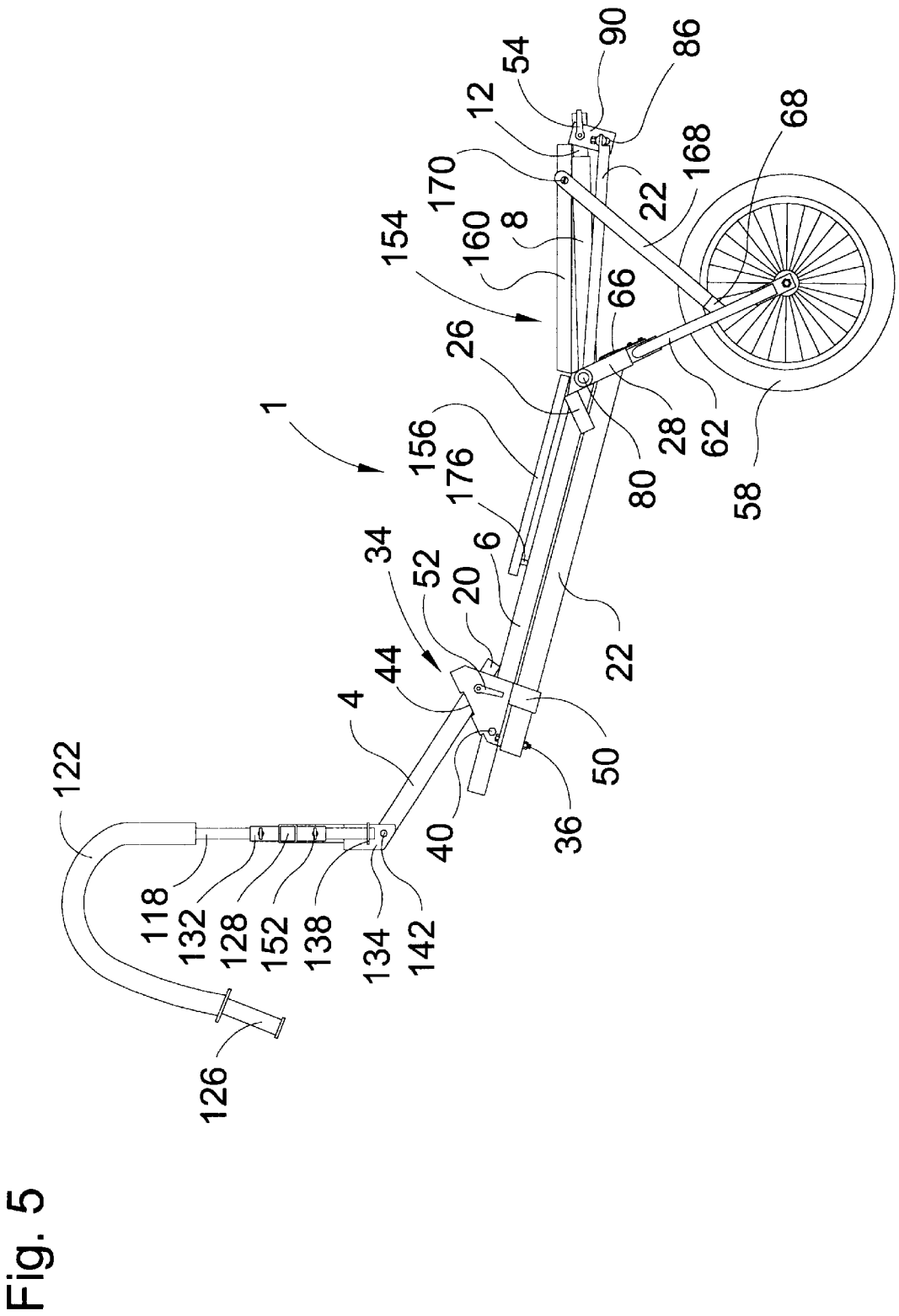
FIG. 5 is a side view of the present inventive apparatus shown in its load bed supporting configuration.

Referring simultaneously to FIGS. 1 and 5, space joint 34 further provides for pivoting motion about pivot pin 40, allowing pole support legs 22 and 24 to upwardly retract in unison with respect to buck pole 2 to a rearwardly extending orientation as depicted in FIG. 5. Pivot stops 46 and 48 of space joint 34 limit downward pivotal motion of pole support leg 22 and 24 to the orientation depicted in FIG. 1.

Referring again to FIG. 1, left and right triangulating braces 76 and 78 respectively extend downwardly from the buck pole 2 to the lower ends of left and right pole support legs 22 and 24. Further referring to FIG. 4, said lower ends of triangulating braces 76 and 78 are preferably pivotally attached to the lower ends of pole support legs 22 and 24 by universal pivot pins 80 and 82. The upper ends of triangulating braces 76 and 78 are similarly pivotally attached to the buck pole 2 by means of universal pivot pins 86 and 88, such pins supporting channel bracket 90. For additional structural rigidity, elbow brace 84 spans between triangulating braces 76 and 78.

Figure 4:
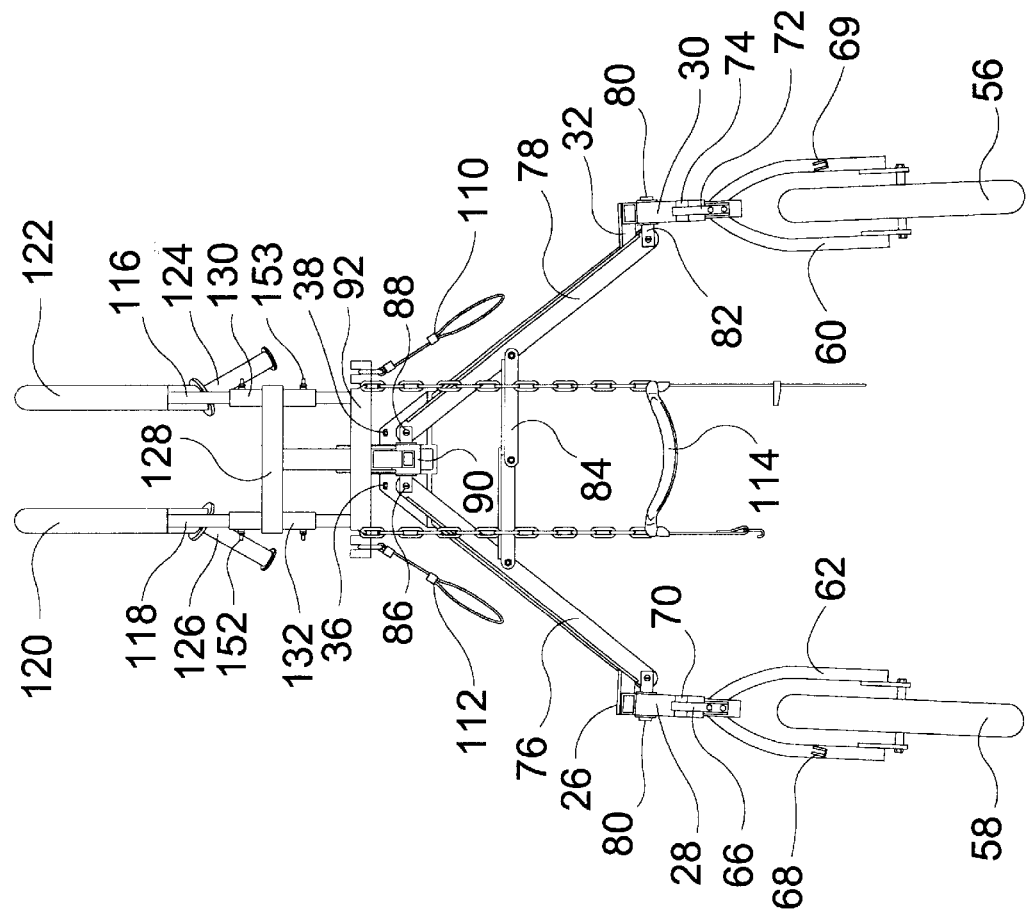
FIG. 4 is a rear view of the apparatus depicted in FIG. 1.

Further referring to FIG. 1, spoked left and right wheels 58 and 56 are rotatably mounted upon the lower ends of left and right pole support legs 22 and 24, preferably by means of left and right wheel receiving yokes or forks 62 and 60. Referring simultaneously to FIGS. 1, 3, and 4, said wheel and fork assemblies are preferably removably attached to the lower ends of left and right pole support legs 22 and 24 by means of slip joints. Preferably, the upper ends of forks 60 and 62 form inwardly coffered slip joint necks 64, and preferably the lower ends of pole support legs 22 and 24 form slip joint sleeves 28 and 30, such necks being upwardly slidably insertable into the lower ends of such sleeves. Left and right spring hooks 66 and 72 are preferably provided for secure engagement of such slip joints, such hooks latchingly engaging with left and right blocks 70 and 74, said blocks being respectively welded to the rearward At walls of sleeves 28 and 30. For purposes of compact storage, or for wheel maintenance, the left and right wheel and fork assemblies may be removed by rearwardly biasing the upper ends of spring hooks 66 and 78, causing said hooks to disengage with blocks 70 and 74, allowing the wheel and fork assemblies to slidably move downwardly from sleeves 28 and 30. For purposes of structural rigidity, left and right triangulating braces 26 and 32 span between the upper ends of sleeves 28 and 30 and pole support legs 22 and 24.

Referring again to FIG. 1, pulling means, preferably in the form of left and right shoulder engaging hooks 118 and 116 are provided, said hooks preferably being pivotally mounted upon the forward end of forward section 4 of the buck pole 2 by means of a "T" bar 128 and a double pivoting joint 134. Preferably, the lower end of the "T" bar 128 is pivotally attached to the double pivoting joint 134 by means of a pivot pin 140. Also preferably, the lower end of double pivoting joint 134 is pivotally attached to the forward end of the forward section 4 of the buck pole 2 by means of pivot pin 142. Said double pivot joint attachment of shoulder engaging hooks 118 and 116 to the forward end of forward section 4 allows free pivoting motion of said hooks with respect to the buck pole 2. Preferably, the proximal ends of left and right shoulder engaging hooks 118 and 116 respectively extend through left and right height adjustment sleeves 132 and 130, said hooks being, referring simultaneously to FIGS. 1 and 4, fixed in place by manually turnable set screws 152 and 153.

Referring again to FIG. 1, for purposes of comfort the shoulder engaging surfaces of left and right shoulder hooks 118 and 116 are preferably covered by nylon fabric bound neoprene rubber sleeves 122 and 120. Also preferably, left and right hand holds 126 and 124 are slidably and fixedly mounted over the distal ends of shoulder engaging hooks 118 and 116. Left and right slide stops 138 and 136 are preferably mounted over the extreme proximal ends of shoulder engaging hooks 118 and 116.

In operation of the shoulder engaging hooks 118 and 116, a hunter stands therebetween, facing forwardly, with his or her head extending upwardly between the curved sections of said hooks. Upon such positioning, the padded undersurfaces of said hooks are allowed to rest upon the hunter's left and right shoulders. The hunter then grasps left and right hand holds 126 and 124 and commences to walk forwardly, drawing the carriage behind.

Figure 2:
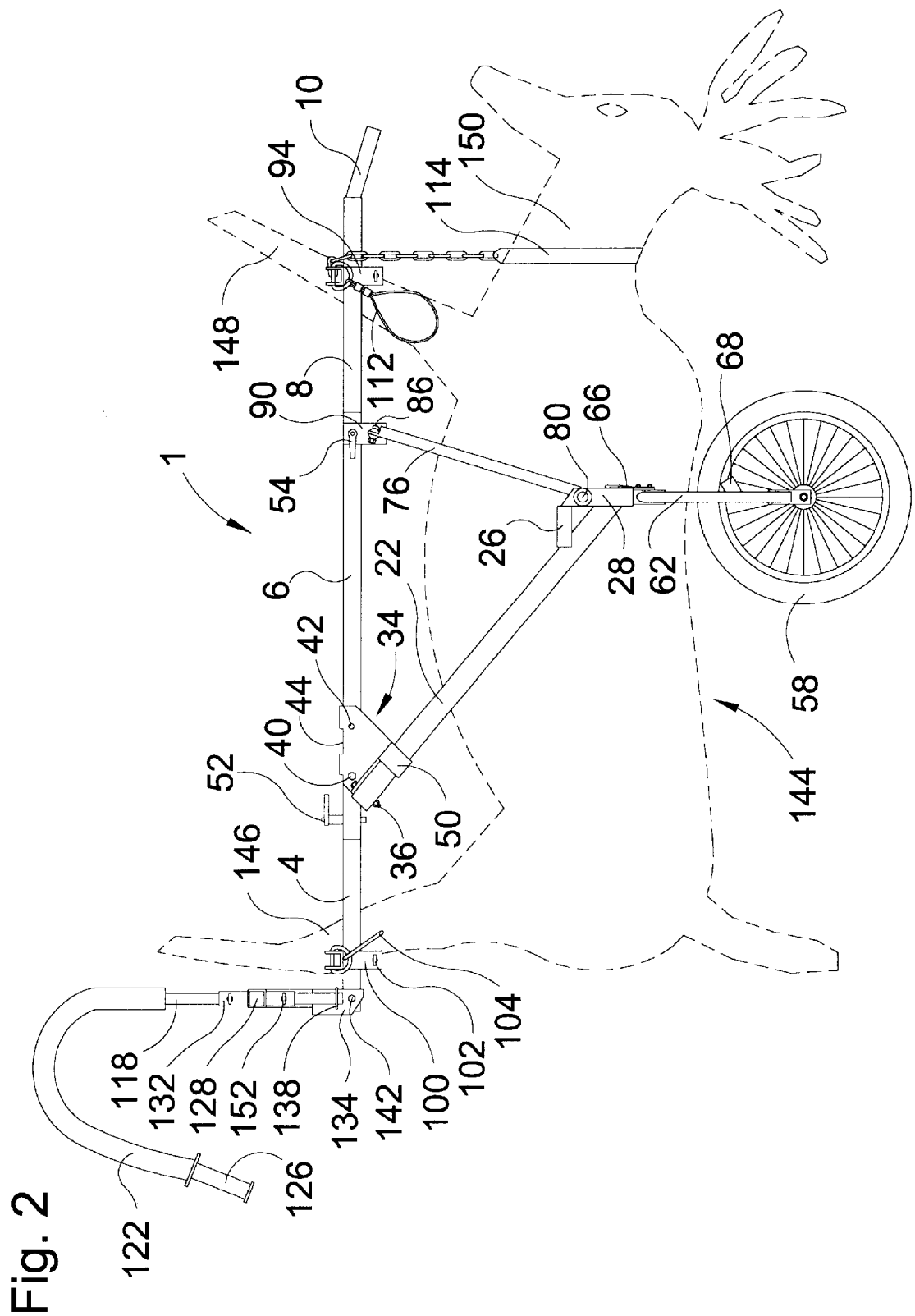
FIG. 2 is a side view of the apparatus depicted in FIG. 1, the view showing a suspended deer in ghost.

Referring simultaneously to FIGS. 1 and 2, deer attaching means preferably in the form of forward and rearward "T" brackets 98 and 92 are fixedly and removably attached to the buck pole 2 by means of downwardly extending channel brackets 100 and 94, said brackets being respectively secured by wingnut and bolt assemblies 102 and 96. The distal ends of the forward "T" bracket 98 are preferably slotted for secure attachment of deer leg engaging clips 104 and 108. Similarly, the distal ends of the rearward "T" bracket 92 are slotted for secure support of deer leg engaging tether loops 112 and 110, and for support of deer head supporting harness 114.

Referring further simultaneously to FIGS. 1 and 2, in operation of carriage 1 configured as depicted, a recently harvested deer represented in ghost and by reference arrow 144 is rolled upon its back, and carriage 1 is rolled thereover so that the deer 144 lies between wheels 56 and 58 and underlies buck pole 2. The forward end of carriage 1 is then raised, lowering tether loops 112 and 110, allowing the deer's forelegs 148 to be extended therethrough. Extension of said legs continues until said loops surround the deer's carpal joints. Upon such loop placement, the distal ends of the deer's forelegs are allowed to pivot rearwardly about their carpal joints, effectively forming hooks for hanging suspension from loops 112 and 110. Head supporting harness 114 is then secured around the deer's neck 150.

Following secure engagement of tether loops 110 and 112 with the deer's forelegs and following attachment of harness 114 around the deer's neck 150, clip receiving apertures are preferably knife cut into the deer's hind legs 146. Preferably, each such aperture extends laterally through the hook-like clefts formed at the junctures of the tibiae and calcanei of said hind legs 146. Clips 104 and 108 are then removed from the distal ends of "T" bracket 98, and said clips are extended through said PI hind leg apertures, causing the clips to engage said clefts. The forward end of buck pole 2 is then driven downwardly, levering upwardly the forward end of the deer 144, and lowering "T" bracket 98. Clips 104 and 108 are then latched upon the slotted distal ends of forward "T" bracket 98. Thereafter, the forward end of buck pole 2 may be raised, pulling hind legs 146 upwardly, and effectively raising the deer 144 off of the ground, resulting in suspended carriage of the deer 144 beneath buck pole 2.

Referring again to FIG. 1, the forward, middle, and rearward sections 4, 6 and 8 of buck pole 2 may suitably be rigidly and permanently attached to each other. Also, a rigid and permanent attachment of the upper ends of pole support legs 22 and 24 to buck pole 2 may serve as a suitable substitute for space joint 34. Also suitably, triangulating braces 76 and 78 may suitably permanently interconnect the lower ends of the pole support legs 22 and 24 with buck pole 54. However, the universally pivotable and removably connectable joints described and depicted above are preferred because such joints facilitate an alternate configuration of the carriage for service as a common cart, and because such joints facilitate disassembly and inward retraction of components for compact storage.

Referring simultaneously to FIGS. 1 and 2, in order to reconfigure the carriage 1 for service as a common load bed supporting cart, wingnut and bolt assembly 96 is loosened, allowing "T" bracket 92, loop tethers 110 and 112, and head harness 114 to be withdrawn rearwardly over rearward section 8 of buck pole 2. Quick release sheer pin 52 is then withdrawn, and forward section 4 of buck pole 2 is withdrawn forwardly from the forward end of middle section 6. Wingnut and bolt assembly 102 is then loosened, allowing "T" bracket 100 to be slidably rearwardly removed from forward section 4. The assembly comprising shoulder hooks 118, "T" bar 128 and forward section 4 is then set aside for later reinstallation as described below.

Referring to FIGS. 1 and 5, quick release sheer pin 54 is then laterally withdrawn, freeing rearward section 8 of buck pole 2 for slidable rearward motion, and releasing channel bracket 90 and triangulating braces 76 and 78 for downward pivoting motion. Rearward section 8 is then rearwardly withdrawn and is rotated 180° within a horizontal plane. Upon such rotation, rearward section 8 is again rotated 180° about its longitudinal axis, directing its inwardly coffered slip joint neck 10 toward the rearward end of middle section 6. Said neck 10 is then slidably inserted into the rearward end of middle section 6 as depicted in FIG. 5. The inwardly coffered slip joint neck 10 of rearward section 8 preferably extends at an angle as depicted, such angle facilitating a desirable angled load bed configuration depicted in FIG. 5.

Referring to FIG. 3, upon insertion of coffered slip joint neck 10 of rearward section 8 into the rearward end of middle section 6, coffered neck 12 rearwardly extends, exposing sheer pin receiving aperture 14. Referring simultaneously to FIGS. 1, 3, and 5, pole support legs 22 and 24 are pivotally moved upwardly until they extend rearwardly along middle section 6. Triangulating braces 76 and 78 are then pivotally moved upwardly until the channel of channel bracket 90 engages the inwardly coffered slip joint neck 12. Quick release sheer pin 54 is then extended through said channel bracket, and thence through sheer pin receiving aperture 14, the sheer pin 54 in combination with channel bracket 90, and in combination with triangulating braces 76 and 78 securely holding rearward section 8 in place. Upon such repositioning of the rearward section 8 and of the triangulating braces 76 and 78, the carriage is properly configured for installation of a load bed designated by reference arrow 154. Suitably, though less desirably, upwardly oriented surfaces of the buck pole 2, the left and right pole support legs 22 and 24, and of the braces 76 and 78 may be utilized for bearing and supporting cargo in the absence of a load bed.

Figure 6:
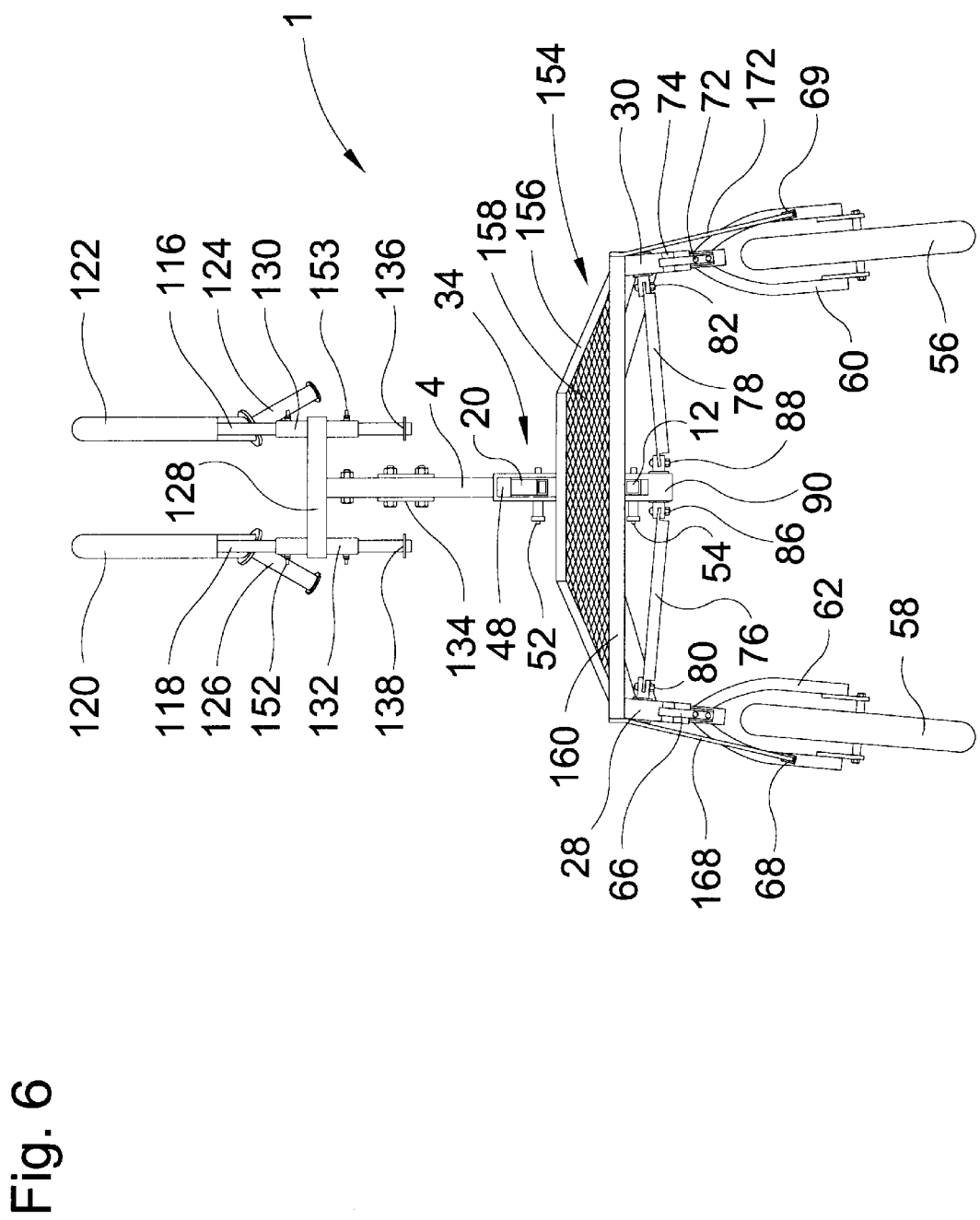
FIG. 6 is a rear view of the apparatus depicted in FIG. 5.

Referring simultaneously to FIGS. 5, 6 and 7, the load bed 154 preferably comprises a rigid forward floor supporting frame 156 and a rigid rearward floor supporting frame 160. While frames 156 and 160 may suitably be configured as a rigid unitary article, the respective rearward and forward ends of such frames are preferably pivotally attached by means of hinges 166 and 164, allowing frame 156 to be compactly folded over frame 160. Frames 156 and 160 support floors 158 and 162, such floors preferably being configured as a wire grid or mesh.

Further referring simultaneously to FIGS. 5, 6, and 7, the rearwardly facing surfaces of the outside tines of forks 62 and 60 preferably incorporate brace receiving sleeves 68 and 69. Said sleeves 68 and 69 are preferably adapted for slidably receiving the lower ends of left and right load bed supporting braces 168 and 172, said braces being respectively pivotally mounted upon the load bed 154 by pivot joints 170 and 174. Referring specifically to FIG. 5, a load bed mounting pin 176 preferably extends downwardly from and is fixedly attached to the lower surface of the forward end of frame 156. Referring simultaneously to FIGS. 1 and 5, pin 176 is slidably inserted into pin receiving aperture 16, said aperture and pin securely positioning the forward end of load bed 154 upon the carriage.

The final step of the cart reconfiguration is adjustment of the shoulder harness pulling angle. Referring simultaneously to FIGS. 1 and 5, it can be seen that upon upward pivotal motion of pole support legs 22 and 24 to their position as depicted in FIG. 5, pivot stops 46 and 48 of space joint 34 rotate upwardly about pivot pin 40, clearing a shaft insertion space beneath shaft receiving aperture 44. To accomplish the pulling angle adjustment, the inwardly coffered slip joint neck 20 of forward section 4 of buck pole 2 is slidably inserted through aperture 44. Referring further simultaneously to FIG. 3, such insertion continues until sheer pin receiving aperture 21 underlies sheer pin receiving aperture 42. Upon alignment of sheer pin receiving apertures, quick release sheer pin 52 is extended laterally therethrough, fixing forward section 4 in an upwardly angled and forwardly extending orientation with respect to middle section 6. Such upwardly angled orientation of forward section 4 assures a proper pulling angle for the carriage while in its load bed supporting configuration.

Referring to FIG. 1, in order to compactly store the carriage, the forward section 4 and shoulder hook assembly may be slidably removed through release of quick release sheer pin 52, and such assembly may be placed in a duffle bag (not depicted). Similarly, the rearward section 8 of buck pole 2 may be slidably removed and placed in such duffle bag. Similarly, "T" bracket assemblies 98 and 92 may be slidably removed and placed in such duffle bag. Also similarly, left and right wheel and fork assemblies 58, 56, 62, and 60 may be slidably removed and placed in such duffle bag. Referring to FIG. 7, load bed 152 may be folded and stowed in such bag. Referring again to FIG. 1, triangulating braces 76 and 78 may be rotated clockwise to a position co-extensive with left and right pole support legs 22 and 24. The middle joint of elbow brace 84 is then drawn forwardly allowing legs 22 and 24 along with braces 76 and 78 to simultaneously pivot inwardly. Said legs and braces may then be pivoted upwardly to a position wherein legs 22 and 24, braces 76 and 78, and middle section 6 are all substantially parallel. In such retracted and folded configuration, such leg, brace, and middle section assembly may be compactly stored in such duffle bag along with all other disassembled components of the carriage.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

INDUSTRIAL APPLICABILITY

The present invention finds specific applicability in the hunting equipment manufacturing industries; particularly, with respect to equipment and devices used for hauling game carcasses and hunting accessories.

What is claimed and desired to be secured by Letters Patent is as follows:

1. A carriage for suspended transportation of harvested game animals, the carriage comprising:
   (a) a pole having a forward end and a rearward end;
   (b) left and right pole support legs, each such leg having an upper end and a lower end;
   (c) leg attaching means connecting the upper ends of the pole support legs to the pole so that said legs extend from said pole;
   (d) left and right wheels;
   (e) left and right wheel attaching means respectively and exclusively connecting the left and right wheels to the lower ends of the left and right pole support legs;
   (f) a-pull harness or handle;
   (g) means for connecting the pull harness or handle to the forward end of the pole; wherein the leg attaching means comprises pivoting means enabling the left and right pole support legs to move pivotally between a laterally splayed game suspending position and a laterally splayed load bed supporting position, the left and right pole support legs extending laterally outward and downwardly from the pole while in the laterally splayed game suspending position; the left and right pole support legs lying within a plane substantially parallel to the pole while in the laterally splayed load bed supporting position, the pivoting means further enabling the pole support legs to move pivotally about a single axis and wherein the carriage allows free suspension of the game between the wheels while in the laterally splayed game suspending position.

2. The carriage of claim 1 wherein the pull harness or handle comprises left and right shoulder engaging hooks.

3. The carriage of claim 2 further comprising left and right triangulating braces respectively extending from the pole to the left and right pole support legs.

4. The carriage of claim 3 further comprising game suspending means operatively connected to the pole.

5. The carriage of claim 4 wherein the game suspending means comprises a forward T-bracket and a rearward T-bracket.

6. The carriage of claim 5 wherein the left and right wheel attaching means comprises left and right wheel retaining forks, each wheel retaining fork having an upper end, the respective connections of the left and right wheels to the lower ends of the left and right pole support legs comprising slip joint attachments of said upper ends to said lower ends.

7. The carriage of claim 1 further comprising a load bed, said bed being removably attachable to the pole.

8. The carriage of claim 1 wherein the pivoting means comprises a space joint enabling the left and right pole support legs to move further pivotally from the splayed game suspending or load bed supporting position to a storage position wherein the left and right pole support legs extend substantially parallel to the pole.

9. The carriage of claim 8 wherein the pole comprises forward, middle, and rearward sections, and wherein the pole further comprises first and second slip joints connecting in sequence said forward, middle, and rearward sections.

10. The carriage of claim 9 wherein the forward section of the pole has a rearward end, and wherein the space joint is adapted for fixedly receiving said rearward end, and for orienting said forward section at an upturned angle from the middle section of the pole.

11. The carriage of claim 10 wherein the pull harness or handle comprises left and right shoulder engaging hooks.

12. The carriage of claim 11 further comprising left and right triangulating braces respectively extending from the pole to the left and-right pole support legs.

13. The carriage of claim 12 wherein the wheel attaching means comprises left and right wheel retaining forks, each wheel retaining fork having an upper end, the respective connections of the left and right wheels to the lower ends of the left and right pole support legs comprising slip joint attachments of said upper ends to said lower ends.

14. A carriage for suspended transportation of harvested game animals, the carriage comprising:

(a) a pole having a forward end and a rearward end;

(b) left and right pole support legs, each such leg having an upper end and a lower end;

(c) leg attaching means connecting the upper ends of the pole support legs to the pole so that said legs extend from said pole;

(d) left and right wheels;

(e) left and right wheel attaching means respectively and exclusively connecting the left and right wheels to the lower ends of the left and right pole support legs;

(f) a pull harness or handle;

(g) means for connecting the pull harness or handle to the forward end of the pole; wherein the leg attaching means comprises pivoting means enabling the left and right pole support legs to move pivotally between a laterally splayed game suspending position and a laterally splayed load bed supporting position, the left and right pole support legs extending laterally outward and downwardly from the pole while in the laterally splayed game suspending position; the left and right pole support legs extending laterally outwardly and rearwardly along the pole while in the laterally splayed load bed supporting position; the pivoting means further enabling the pole support legs to move pivotally about a single axis; the pivoting means comprising a space joint enabling the left and right pole support legs to move further pivotally from the splayed game suspending or load bed supporting position to a storage position wherein the left and right pole support legs extend substantially parallel to the pole; the pole comprising forward, middle, and rearward sections; the pole further comprising first and second slip joints connecting in sequence said forward, middle, and rearward sections; the forward section of the pole having a rearward end; the space joint being adapted for fixedly receiving said rearward end, and for orienting said forward section at an upturned angle from the middle section of the pole; the pull harness or handle comprising left and right shoulder engaging hooks and wherein the carriage allows free suspension of the game between the wheels while in the laterally splayed game suspending position.

15. The carriage of claim 14 further comprising left and right triangulating braces respectively extending from the pole to the left and right pole support legs.

16. The carriage of claim 15 wherein the wheel attaching means comprises left and right wheel retaining forks, each wheel retaining fork having an upper end, the respective connections of the left and right wheels to the lower ends of the left and right pole support legs comprising slip joint attachments of said upper ends to said lower ends.

\* \* \* \* \*